Aug. 22, 1961  H. P. WRIGHT  2,997,172
POTATO HARVESTER

Filed May 19, 1958  4 Sheets-Sheet 1

Harry P. Wright
INVENTOR.

Aug. 22, 1961 H. P. WRIGHT 2,997,172
POTATO HARVESTER
Filed May 19, 1958 4 Sheets-Sheet 2

Harry P. Wright
INVENTOR.

BY
Attorneys

Aug. 22, 1961  H. P. WRIGHT  2,997,172
POTATO HARVESTER

Filed May 19, 1958  4 Sheets-Sheet 3

Harry P. Wright
INVENTOR.

Aug. 22, 1961  H. P. WRIGHT  2,997,172
POTATO HARVESTER
Filed May 19, 1958  4 Sheets-Sheet 4

Harry P. Wright
INVENTOR.

BY Clarence A. O'Brien
and Harvey B. Jacobson
Attorneys

United States Patent Office 2,997,172
Patented Aug. 22, 1961

2,997,172
POTATO HARVESTER
Harry P. Wright, P.O. Box 45, Caribou, Maine
Filed May 19, 1958, Ser. No. 736,370
8 Claims. (Cl. 209—33)

This invention relates to potato harvesters and more particularly to improvements in harvesters by which potatoes are harvested more efficiently and with greater speed.

An object of this invention is to provide improvements in potato harvesters of the type which use one or more diggers in addition to conveyors to translate the potatoes through a path of travel during which the soil, stones, vines and other trash or unwanted material are separated from the potatoes.

A more specific object of the invention is to provide improvements in potato harvesters of the above-mentioned type, the improvements centering largely, although not exclusively, about a brush combined with a trash removal conveyor and an air blowing system for doing two things. The first is to aid in refuse-potato separation and the second is to move the potatoes after they are set into a bouncing, shaking and oscillating condition by falling from a more or less conventional conveyor onto a conveyor which has a highly elastic bed.

In carrying out the invention the harvester is adapted to attach to a conventional tractor with various tractor equipment being used to power the group of conveyors and the digger. The potatoes are first dug and delivered up a conveyor and deposited on a transverse conveyor which is preferably located at the rear of the tractor. When used, the initial air blast reacts on the potatoes and the trash while being conveyed on this transverse conveyor. This causes the initial air separation of the refuse material from the potatoes with the potatoes progressing until they fall onto an endless conveyor that has a live rubber bed. This last mentioned conveyor delivers the trash, soil, rocks, etc. back to the ground with a brush aiding in this operation and keeping the soil, trash, etc. moving to the discharge end thereof. At the time that the potatoes fall onto the live rubber bedded conveyor, they are ready for final separation which is by and large caused by an air blast draft across the live rubber bedded conveyor, imparting enough of a lateral component of force onto the oscillating potatoes to spill them over the side of the last mentioned conveyor and deposit them onto an open web transfer conveyor which is generally parallel to the transverse conveyor. From here they are deposited onto a conventional discharge conveyor located near stools on which one or more men may stand (or be seated), to recover any potatoes that would ordinarily discharge onto the ground as waste and to take care of other duties.

Another important, but optional feature of the invention, is the way that the live rubber conveyor is mounted. It is capable of being adjusted as to inclination in order to compensate for any tilt upon the terrain over which the tractor is operating. This promotes more efficient operation in the trash disposal functioning and the potatoes separating functioning of the harvester.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an exploded perspective view of the combined brush and shield that is operatively connected with the live bed conveyor in the harvester.

FIGURE 6 is a sectional view taken on the line 6—6 of FIGURE 1.

FIGURE 7 is a schematic view showing a suggested means for adjusting the angularity of one of the conveyors.

Figure 1:
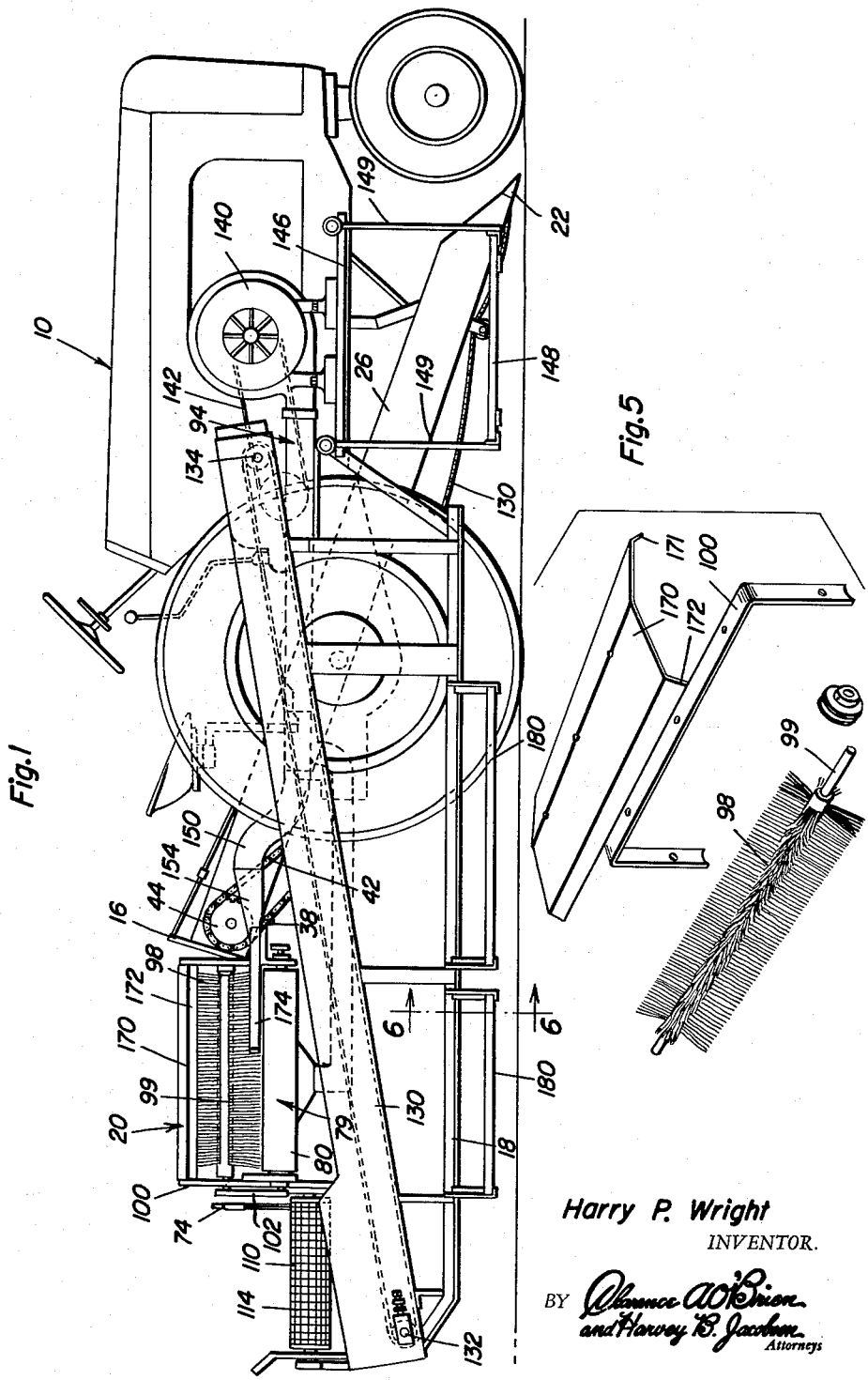
FIGURE 1 is a side view of a conventional tractor fitted with a potato harvester that is constructed in accordance with the invention.

In the accompanying drawings there is a conventional tractor 10. Among the other necessary structure in the tractor there is a rear power take-off shaft 12 and a front power take-off pulley 14. The tractor mounting structure 16 at the aft of the tractor is conventional and used to at least partially support the frame 18 of the harvester 20. The frame is engineered to be reasonably lightweight but yet support all of the operative parts of harvester 20 in a substantial manner. Therefore, frame 18 has only the necessary structural frame members by which to firmly attach it in a manner that it can be reasonably easily separated from the tractor.

The digger 22 of the harvester is at the front end of digger conveyor 24. The digger conveyor is mounted in structural frame members 26 located on one side, for example the left side, of the tractor. Digger conveyor 24 is made from an endless web 28 that has a number of spaced rods, each pivotally connected at their ends to the adjacent rods. The web is mounted for rotation on lower end sprockets or rollers 32 and upper end sprockets or rollers 34, the rollers or sprockets attached to forward shaft 36 and rear shaft 38 respectively. Both of these shafts are carried by bearings in the frame members 28 and they constitute a part of the digger conveyor. Shaft 12 has a drive wheel 39 thereon which is drivingly connected through slip clutch 40, to shaft 12. Belt 42 is entrained around wheel 39 and also entrained around sprocket 44 that is secured to shaft 38. This sets the digger conveyor into motion for potato digging operations. Since the digger conveyor 24 is at an incline with the digger 22 at the lower end, the discharge or upper end of digger conveyor 24 can be conveniently located slightly above transverse conveyor 46 that is supported in a subframe 48 that extends across the back of tractor 10. Endless conveyor 46 is constructed in essentially the same way as digger conveyor 24. That is, it is made of a plurality of spaced bars 50 connected in an endless web and entrained over a pair of sprockets 52 and another pair of sprockets or rollers 54 at the opposite ends of the endless web. Sprockets 52 are attached to shaft 56 while sprockets 54 are attached to shaft 58, and these are mounted for rotation in bearings in subframe 48 of frame 18. The discharge end of digger conveyor 24, after sifting some of the refuse from the potatoes, unloads or discharges onto conveyor 46. Guard 60, constructed of a roller or a plurality of rollers 62, is located at one side of subframe 48 and above the plane of the upper flight of conveyor 46. The roller or rollers are powered by chain 66, belt or a like drive member and trained around pulleys or sprockets 67 and 68 that are secured to shaft 38 and roller shaft 69 respectively. The guard functions as a fence to prevent overriding conveyor 46 as the potatoes are emptied thereon.

Subframe 70 is mounted slightly below and as an approximate axial continuation of subframe 48. The frame 70 is preferably capable of being tilted about hinge 72 as an axis. This hinge is carried by structural frame members 73 of frame 18 (FIGURE 7) and has a lever 74 connected to it by means of linkage 75, a portion of which is pivoted to subframe 70 and another portion of which is connected to a part of the main frame 18. Locking device 78, such as a quadrant and pawl, is operatively connected with lever 74 to hold the subframe 70 in a selected tilted position. The purpose of tilting the subframe is to have conveyor generally designated 79 movable to selected angularities in order that the slope of the terrain can be compensated for in the operation of the harvester. Endless conveyor belt 80 is constructed of an endless web of elastic, resilient material, for example, live rubber. One end is entrained around roller 81 that is supported on roller shaft 82, the latter being mounted for rotation in bearings in subframe 70. The opposite end of the conveyor 80 is mounted on a roller 83 supported by subframe 70 by means of shaft 85. The power to drive the endless conveyor 80 is taken from shaft 12 through a set of miter gears 88 on shaft 12 and on shaft 89. The shaft 89 has a pulley or sprocket 90 secured to it and a belt or chain 91 entrained thereover. This belt or chain is also entrained over a pulley or sprocket 92 that is secured to shaft 82. Conveyor 46 is also powered from shaft 89 by drive assembly 47. Inasmuch as the potato receiving end of conveyor belt 80 is below the discharge end of conveyor 46, the potatoes and what is left of the debris, are required to drop onto the live rubber bed of conveyor belt 80 thereby setting the potatoes into an oscillation, bouncing, jostling, etc. condition. This brings into focus the air blast system 94 (FIGURE 2) which will be described subsequently. It is at this point that the potatoes are finally separated from the remaining debris and rocks, sod, etc. The debris including rocks, sod and the like remains on conveyor belt 80 as the conveyor is operated and is spilled over the discharge end 97 thereof and returned to the ground. To keep the debris moving, prevent accumulations and increase the efficiency of the conveyor belt 80, a transverse brush 98 extends across the upper flight of conveyor belt 80. The brush has radial bristles emanating from a shaft 99 that is mounted for rotation in bearings (apertures) in an upstanding substantially U-shaped bracket 100 (FIGURE 5) that is attached to subframe 70 and that spans the transverse dimension of the endless conveyor belt 80. The brush is rotated by a belt or sprocket chain 102 that derives its motivation from a pulley or sprocket 103 on the end of shaft 85. Another pulley 104 is attached to the end of shaft 99 thereby transferring the rotational force of shaft 85 to shaft 99.

Air blast system 94 provides a lateral thrust onto the potatoes as they are dropped onto the live bed conveyor belt 80. The draft is in a direction transversely across the upper flight of conveyor belt 80, driving the potatoes onto transfer conveyor 110 which is disposed in a subframe 112 of the main frame 18 and along the rear edge of conveyor belt 80. The transfer conveyor 110 has an open web 114 and is mounted for rotation and supported by rear and front rollers 116 and 118 respectively. These rollers have roller shafts, one of which 120, has a drive sprocket or pulley 122 thereon. A chain or belt 124 is entrained around the drive sprocket or pulley 122 and around a drive sprocket or pulley 126 that is fixed to rotating shaft 89. Conveyor 110 is short with its discharge end 128 located above the inlet end 129 of the final conveyor elevator 130. Conveyor elevator 130 has a conveyor roller 132 at one end, the lower end, and a conveyor roller 134 at the upper end. The upper end roller has a drive connection with the power take-off shaft 15 which is secured to the power take-off pulley 14 of the tractor. Chain or belt 136 is drivingly connected with sprockets or pulleys 137 and 138 attached to shaft 15 and the shaft of roller 134 respectively.

The air blast system consists of a blower 140 that is driven by belt 142 entrained around power take-off pulley 14 and around a drive pulley 144 of the blower. The blower is supported on a platform 146 that has an occupant step 148 suspended therefrom by supports 149 (FIGURE 1). This portion of the frame can be attached directly to the tractor front drawbar or some other mount at the front or middle of the tractor. Air blast tube 150 is attached to the blower air outlet and has an air nozzle 154 at its discharge end. This air nozzle is flat and wide and is located along the edge 156 of the conveyor belt 80. The main air is delivered across the conveyor 80 by the nozzle 154, and it is this air that imparts a rearward force (with respect to the direction of travel of the tractor) on the potatoes to have them move onto transfer conveyor 110. As they move from conveyor 80 to conveyor 110, they move over the flap 160 that is along the confronting edges of these conveyors. In order to have the nozzle 154 move a small distance as the conveyor 80 is adjusted, the main air blast tube 150 can have a slip coupling 161 therein enabling the necessary deflection to be achieved. Prior to this in the direction of travel of the potatoes, initial air separation of the debris and potatoes is aided by air nozzle 162 that is located about fifteen inches inwardly from the discharge end of conveyor 46. The nozzle 162 faces generally upwardly and is connected with the main air tube 150 by means of a duct 164. Dampers can be applied in either duct 164 or tube 150 or both.

After the debris is propelled past the flap 160, the debris remaining on the conveyor 80 while the potatoes are driven therefrom by the air blast and the bouncing of the potatoes, is further aided in discharge by brush 98 that is supported in the bearings of mounting bracket 100. A hood 170 is attached to the conveyor standing part of bracket 100 and has downturned edge portions 171 and 172 on opposite sides of brush 98. In addition, an upstanding angulated deflector plate 174 that is carried by a top part of the main frame 18 and near the discharge end of conveyor 80, aids in the deflection of the stones, rocks, sod, and other refuse as it is propelled off the discharge end of conveyor 80.

Figure 2:
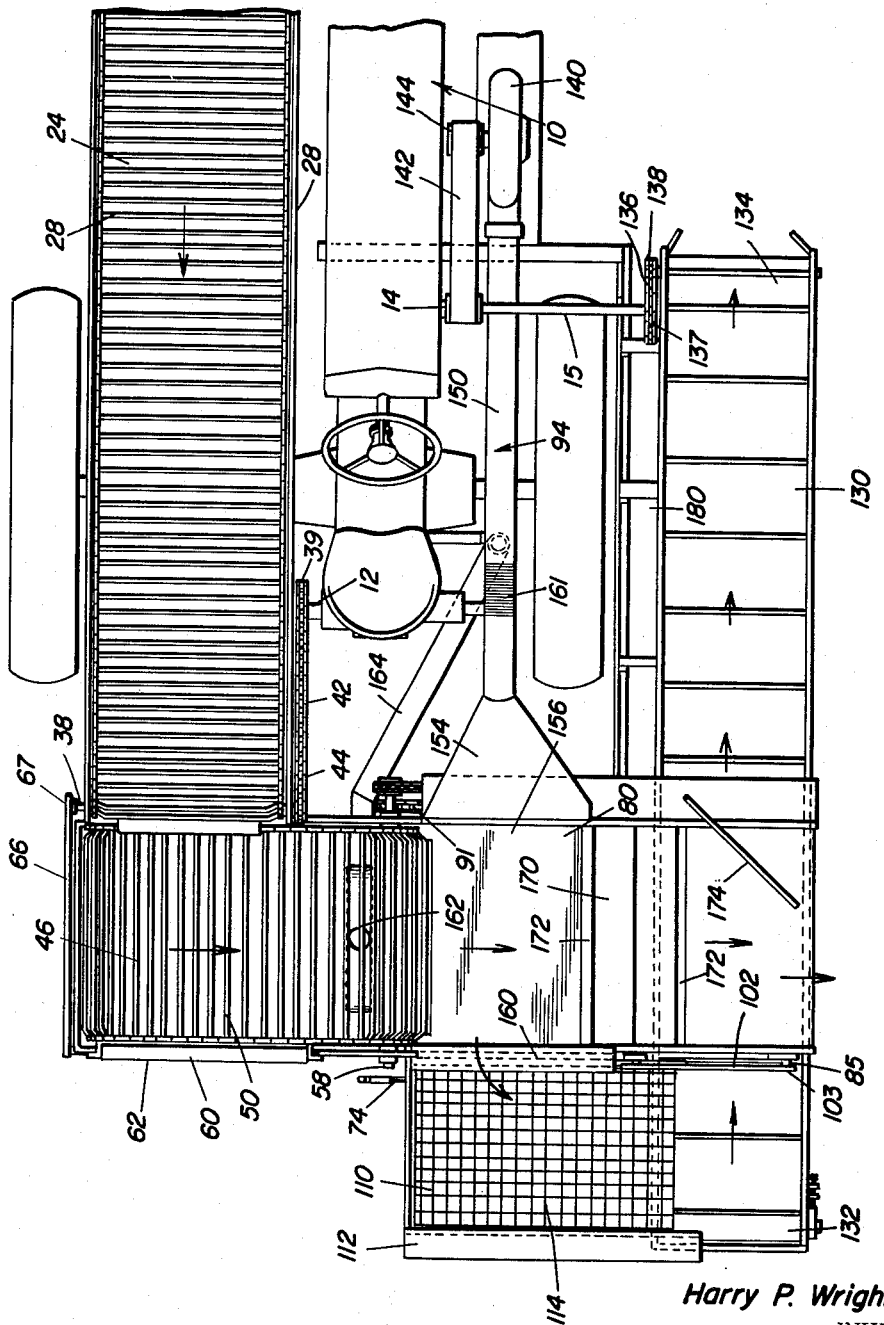
FIGURE 2 is a top view of the equipment in FIGURE 1.
Figure 3:
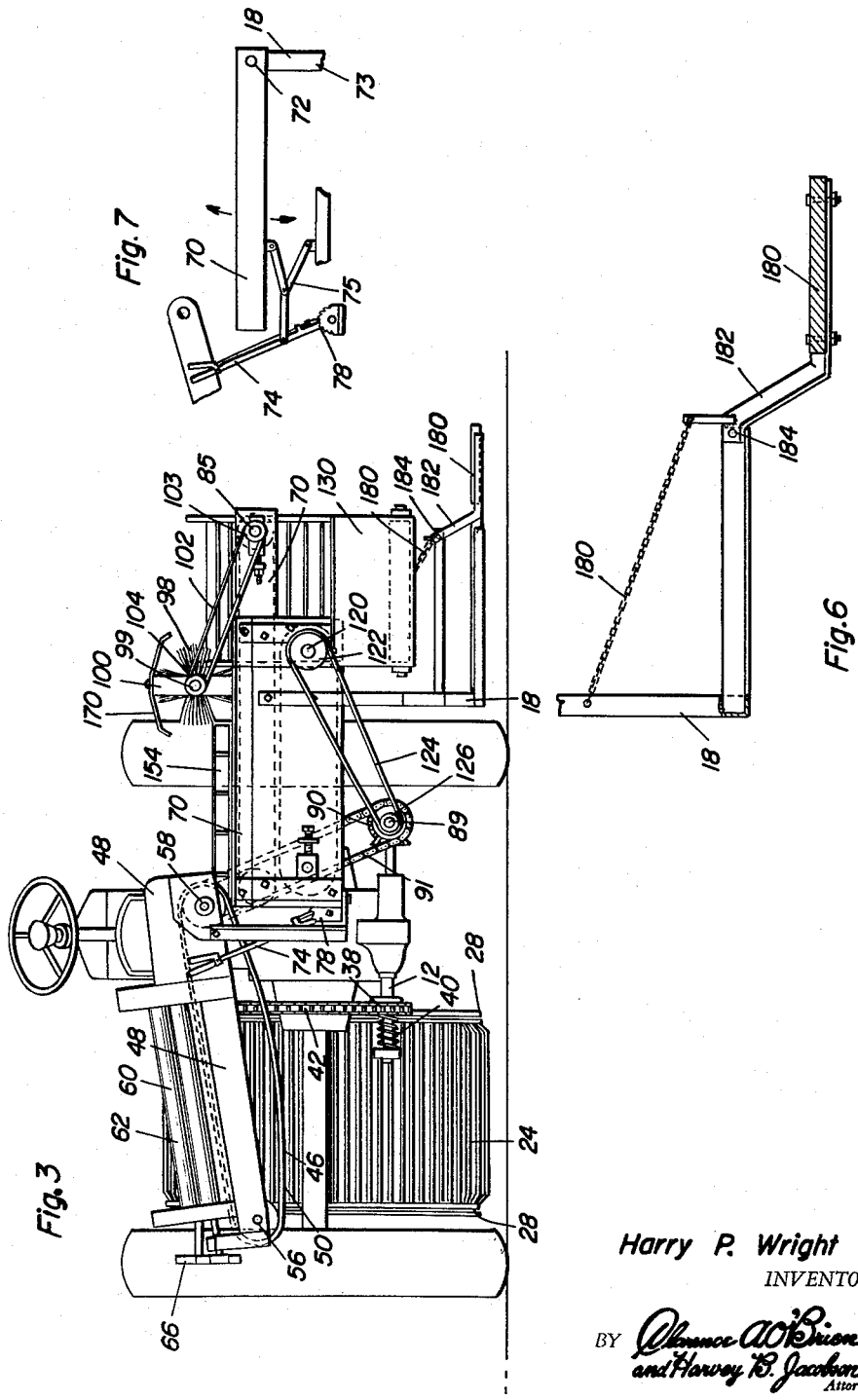
FIGURE 3 is a rear view of the equipment in FIGURE 1.
Figure 4:
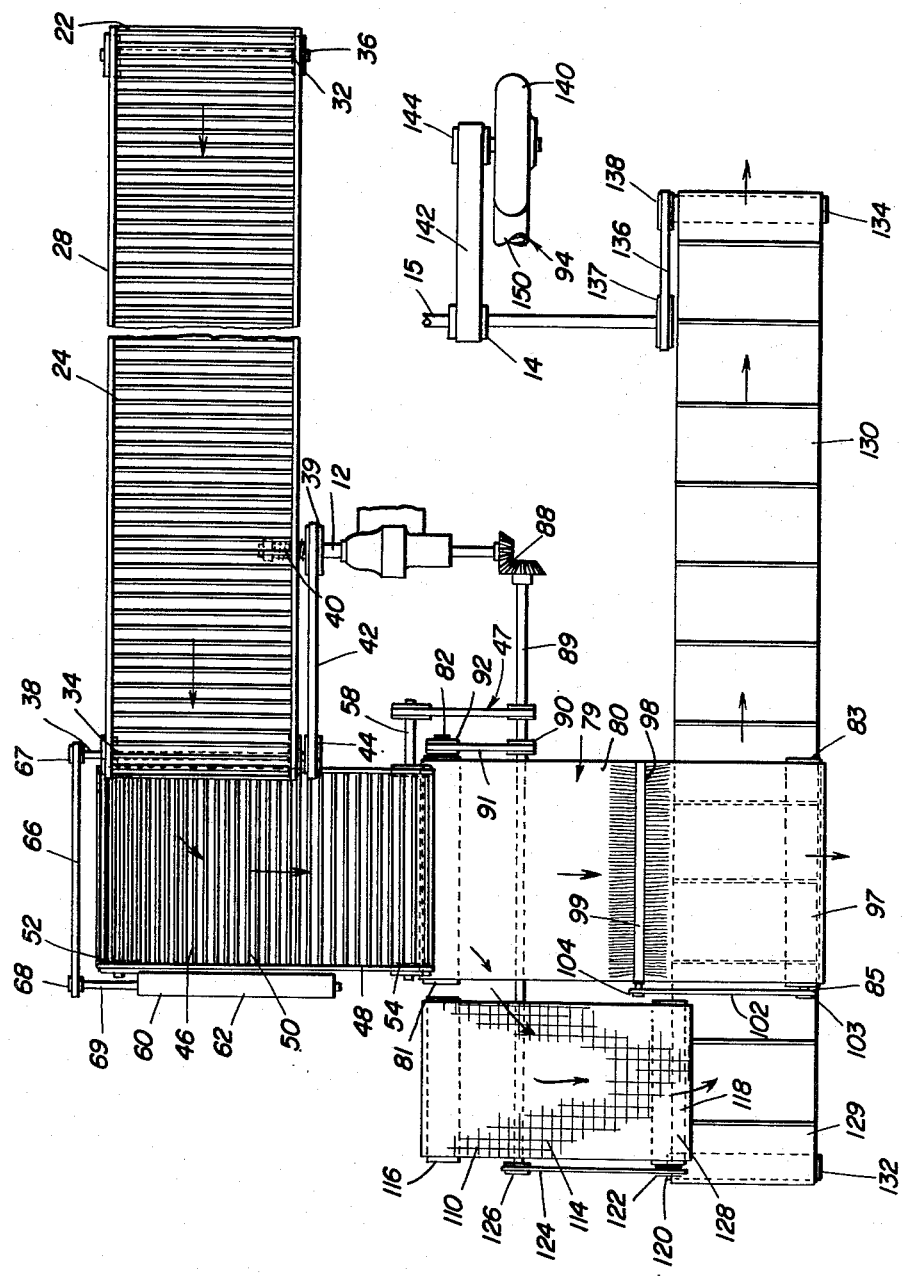
FIGURE 4 is a schematic plan view of the harvester, only the parts of the tractor that are used for motive power being shown.

Lever 74 is shown as in FIGURE 2 at one end of transfer conveyor 110. But it is to be clearly understood it can be relocated, can have a much longer extension or can be otherwise altered to be accessible to the men or man working on step 148 or steps 180 (FIGURE 6) located beneath and alongside of the conveyor elevator 130. The steps 180 are carried by structural supports 182 attached to and constituting a part of the main frame. These structural supports are on pivots 184 so that they can swing up to an inoperative position on frame 18. They are held in the outward or operative position with the step portion substantially horizontal, by means of a plurality of motion limiting chains 184 that are attached to the main frame 18 and a part of structure 182.

Many modifications, changes, and common expedients may be resorted to. For example, the shafts or rollers of each conveyor have conveyor tension adjusting devices connected with them. All other changes of this nature or others may be made without departing from the scope of the following claims.

What is claimed as new is as follows:

1. A potato harvester adapted to be attached to a tractor, said potato harvester including a first conveyor at one side of the tractor, a transverse conveyor having a portion located below the discharge end of said first conveyor and arranged transverse to the general plane of the first conveyor, a fence including at least one roller along one edge of said transverse conveyor for preventing the potatoes from overriding said transverse conveyor, an elastic bed conveyor means in approximate longitudinal alignment with said transverse conveyor and having an inlet end located below the discharge end of said transverse conveyor means and vibrating in a direction perpendicular to its direction of movement in response to impact from debris and potatoes discharged onto said elastic bed conveyor means with the potatoes bouncing or otherwise oscillating due to the fall onto said elastic bed means, means for delivering air under pressure across said elastic bed means to apply an aerodynamic force onto the oscillating potatoes and propel them over a side edge of said elastic bed conveyor means while the major part of the debris remains on said elastic bed conveyor means for discharge to the ground, means including an elevator conveyor for accepting the potatoes after they are aerodynamically impelled from said elastic bed conveyor means and delivering them to a receiving station, a rotating brush superposed over said elastic bed conveyor means, means for rotating said rotating brush, and a deflector near the discharge end of said elastic bed conveyor means to deflect the debris onto the ground.

2. A potato harvester adapted to be attached to a tractor, said potato harvester including a first conveyor at one side of the tractor, a transverse conveyor having a portion located below the discharge end of said first conveyor and arranged transverse to the general plane of the first conveyor, a fence including at least one roller along one edge of said transverse conveyor for preventing the potatoes from overriding said transverse conveyor, an elastic bed conveyor means in approximate longitudinal alignment with said transverse conveyor and having an inlet end located below the discharge end of said transverse conveyor means and vibrating in response to impact from debris and potatoes discharged onto said elastic bed means conveyor with the potatoes bouncing or otherwise oscillating due to the fall onto said elastic bed means, means for delivering air under pressure across said elastic bed means to apply an aerodynamic force onto the oscillating potatoes and propel them over a side edge of said elastic bed conveyor means while the major part of the debris remains on said elastic bed conveyor means for discharge to the ground, and means including an elevator conveyor for accepting the potatoes after they are aerodynamically impelled from said elastic bed conveyor means and delivering them to a receiving station, means including a subframe mounting said elastic bed conveyor means on the frame, and means for tilting said subframe and said elastic bed conveyor means to compensate for the slope of the land over which and in which the harvester is operating.

3. The harvester of claim 2 wherein there is a brush superposed over said elastic bed conveyor means, means for rotating said brush operatively connected with said brush.

4. The harvester of claim 2 wherein there is a brush superposed over said elastic bed conveyor means, means for rotating said brush operatively connected with said brush, a deflector disposed over said rotating brush.

5. The harvester of claim 2 wherein there is a brush superposed over said elastic bed conveyor means, means for rotating said brush operatively connected with said brush, a deflector disposed over said rotating brush, a second deflector located over the portion of said elastic bed conveyor means located between the first mentioned deflector and the discharge end of said deflector in order to deflect the debris as it is propelled by said elastic bed conveyor means.

6. The harvester of claim 3 wherein the conveyor at the discharge end of said transverse conveyor is open web, and means for delivering air under pressure generally upwardly through the open web conveyor to cause separation of the soil and some of the debris from the potatoes prior to discharge onto said elastic bed conveyor means.

7. A potato harvester comprising, digger conveyor means disposed forwardly of the harvester for receiving potatoes and debris thereon, transfer means disposed rearwardly of said conveyor means on the harvester for receiving potatoes and debris from the conveyor means, resilient vibrating bed means disposed beneath a delivery end of said transfer means and vibrating in response to impact of potatoes and debris falling thereon to bounce the potatoes, first air blast means disposed beneath said transfer means and directed upwardly therethrough for dispersing debris of less density than said potatoes while debris of greater density remains, second air blast means disposed along one side of said resilient vibrating bed means and directed transversely across said bed means to impel the bouncing potatoes off the bed means for separation from remaining debris on the bed means.

8. The harvester as defined in claim 7 including screen conveying means disposed along a side of said bed means opposite said one side thereof for receiving potatoes and further separating debris therefrom, said screen means delivering the potatoes to a delivery elevator means.

References Cited in the file of this patent

UNITED STATES PATENTS

| | | |
|---|---|---|
| 1,080,501 | Tibyrica | Dec. 2, 1913 |
| 1,715,218 | Wright et al. | May 28, 1929 |
| 1,740,723 | Blewett | Dec. 24, 1929 |
| 1,894,058 | Rice | Jan. 10, 1933 |
| 2,257,322 | Barnard | Sept. 30, 1941 |
| 2,315,929 | Bridges | Apr. 6, 1943 |
| 2,468,639 | Sample | Apr. 26, 1949 |
| 2,539,022 | Kreider | Jan. 23, 1951 |
| 2,597,673 | Ritter | May 20, 1952 |
| 2,612,993 | Levesque | Oct. 7, 1952 |
| 2,776,730 | Crawford | Jan. 8, 1957 |

FOREIGN PATENTS

| | | |
|---|---|---|
| 527,057 | Canada | July 3, 1956 |